Dec. 25, 1962 T. M. BALL 3,070,347
MANIFOLD HEAT VALVE
Filed April 23, 1959
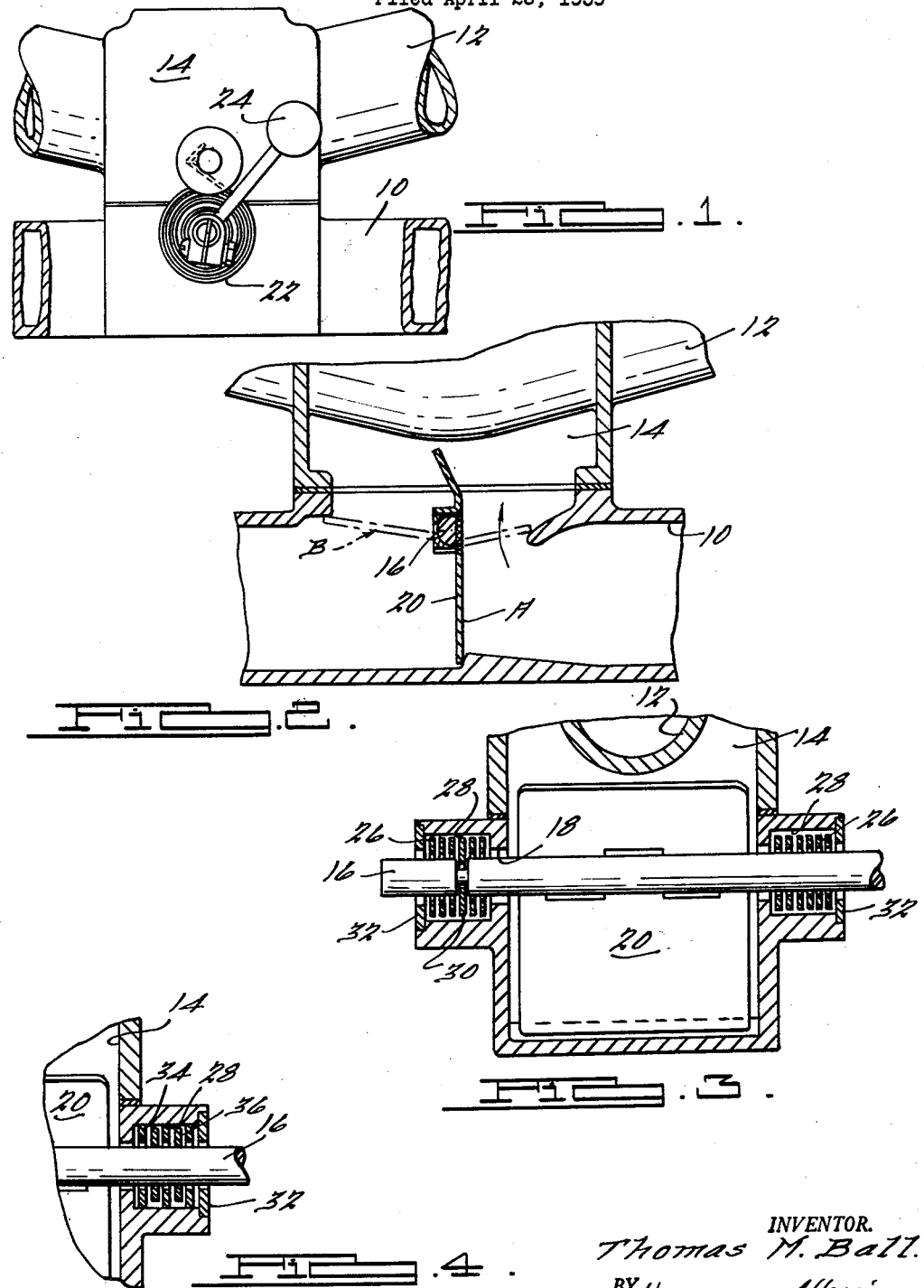
INVENTOR.
Thomas M. Ball.
BY Harness and Harris
ATTORNEYS.

United States Patent Office 3,070,347
Patented Dec. 25, 1962

3,070,347
MANIFOLD HEAT VALVE
Thomas M. Ball, Bloomfield Hills, Mich., assignor to Chrysler Corporation, Highland Park, Mich., a corporation of Delaware
Filed Apr. 23, 1959, Ser. No. 808,444
5 Claims. (Cl. 251—303)

This invention relates to exhaust manifold heat control valves and in particular to a novel type of bearing and baffle means therefor.

In the conventional type of exhaust manifold heat control valve, the shaft carrying the valve body is customarily mounted in a bearing in the valve housing. This bearing is ordinarily made of brass or other type of bearing material and is closely fitted onto the shaft so that the shaft may rotate freely therein but not so much as to wobble and cause noise. By having such a close fit between the shaft and its bearing the shaft frequently freezes up in the bearing due to warping of the shaft, differences in expansion and contraction of the shaft and the bearing material and of the housing in which the bearing or bushing is frictionally fitted, and also because of the exhaust gases which frequently contain carbon, varnishes, acids, etc., which act as adhesives and pitting agents. This freezing up of the shaft in its bearing becomes progressively worse with engine usage and eventually prevents the valve from performing its function.

Applicant's invention of a novel type of bearing and baffle means for the shaft obviates these difficulties while providing a satisfactory gas baffle and bearing for the shaft. Applicant's bearing and baffle means consists of a plurality of washers which are relatively loosely held on a shaft and freely shiftable and rotatable on the shaft within the washer retaining portion of the valve housing. These washers, however, are not so loose on the shaft and in the housing as to cause excessive vibration of the shaft and thereby produce noise.

It is a principal object of this invention to provide a satisfactory bearing and exhaust gas baffle means to prevent the shaft of a heat control valve from freezing in its mounting while preventing hot gas from leaking to an excessive extent through said mounting.

A specific object is to provide bearing means for a valve which will allow deformation of the valve shaft to occur without binding in said bearing means.

A further specific object is to provide a variation of the aforesaid baffle and bearing structure comprising alternate or substantially alternate washers mounted on the valve shaft and in the housing wherein the alternate or substantially alternate ones of the washers contact the housing and the shaft respectively.

Further objects and advantages of the present invention will become apparent from the following description and drawings, in which:

FIGURE 1 represents a side view of an intake and exhaust manifold with the valve counterweight and thermostatic structure shown;

FIGURE 2 represents a cross sectional view of the structure of FIGURE 1;

FIGURE 3 represents a cross sectional view of the valve structure showing the washer means and cross section; and FIGURE 4 shows a cross sectional view of the variation of the washer means of FIGURE 3.

Referring to the drawings and in particular to FIGURE 1, an exhaust manifold 10 has mounted thereon an intake manifold 12 which includes a hot spot chamber 14 for heating the intake gas and air mixture. As shown in FIGURE 3 a valve shaft 16 extends through openings 18 in the valve housing and has fixed thereto a valve body 20, which, as shown in FIGURE 2, has two extreme positions A and B, A representing the cold engine valve condition and B representing the hot engine valve condition. As shown in FIGURE 2 by the arrows, the exhaust gases are deflected up into the hot spot chamber when the valve is in the position A to thereby heat the intake manifold and the incoming fuel and air mixture. The valve body 20 is adjusted by a thermostatic coil 22 connected to shaft 16 and which is counterbalanced by a counterweight 24 also connected to shaft 16 and which urges the valve to its open position B against the force of thermostatic spring 22. As the exhaust gases and engine heat up, the valve shifts from position A to position B as the force of spring 22 diminishes and counterweight 24 moves the valve to the open position.

Referring to FIGURE 3 a plurality of washers 26 of an annular shape are contained in a baffle chamber 28 located on either side of the exhaust manifold 10 and integrally formed therewith. Washers 26 have sufficient clearance between the interior of the chamber 28 and the shaft 16 to allow the shaft 16 to move slightly in a direction transversely to its axis of rotation but not enough to cause excessive vibration and noise. It is particularly noted that any reasonable amount of deformation or warping of the shaft due to heat or other means will be taken up by the clearance of the washers. These washers also act as sound deadeners and as gas baffles. A split ring 30 prevents shaft 16 from significantly changing its longitudinal position in the housing while allowing longitudinal expansion of the shaft 16 relative to the housing to prevent binding of the shaft therein. Retaining rings 32 are secured to the outside of each chamber 28 by staking or other suitable means.

Referring to FIGURE 4 washers 34 are slidably frictionally engaged with the wall of chamber 28 and have clearance with the shaft 16, while washers 36 are frictionally slidably engaged with shaft 16 and have clearance with the wall of chamber 28. As shown in this figure the washers are alternately nested in the chamber 28, however, this alternate nesting is not necessary but is desirable to produce the greatest baffling effect. The interior walls of chamber 28 are preferably circular to cooperate with the circular outer surface of the washers 26 and 34 in allowing the washers to freely rotate therein.

Washers 26, 34 and 36 may be of brass, stainless steel, or other material and a sufficient number of them may be provided to insure sufficient baffle effect and bearing surface for the shaft 16 in order to eliminate excessive wear of either the washers or the shaft.

I claim:
1. A manifold heat control valve comprising a housing having a heat flow passage therethrough, a valve body in said passage operable for controlling flow through said passage, a shaft to which said valve body is secured, means pivotally supporting said shaft in said housing, said pivotal support means comprising washer means within said housing and encircling said shaft, said washer means constituting the sole pivotal bearing support for said shaft, and said washer means defining with said housing sufficient clearance between said housing and said shaft to compensate for warping of said shaft due to heat.

2. A heat control valve as claimed in claim 1 wherein said washer means comprises a plurality of tandemly arranged washers carried by said shaft and traversely movable therewith relative to said housing, said washers being of such external dimension as to provide said compensating clearance between said shaft and housing.

3. A heat control valve as claimed in claim 1 wherein said washer means comprises a plurality of tandemly arranged washers, certain of said washers being carried by said shaft and being transversely movable therewith relative to said housing and other of said washers being carried by said housing and facilitating transverse movement of the shaft relative to these washers.

4. A heat control valve as claimed in claim 1 wherein said housing includes side portions defining chambers for receiving said washer means which chambers have wall portions surrounding said washer means which with said washer means define said compensating clearance.

5. A heat control valve as claimed in claim 4 wherein said washer means provides a baffle sealing means between said heat flow passage and said chambers.

References Cited in the file of this patent

UNITED STATES PATENTS

| | | |
|---|---|---|
| 378,978 | Ryan | Mar. 6, 1888 |
| 2,282,825 | Puffer | May 12, 1942 |
| 2,708,610 | Donaldson | May 17, 1955 |
| 2,835,268 | Dillberg | May 20, 1958 |
| 2,857,926 | Rundquist | Oct. 28, 1958 |
| 2,946,554 | Asker | July 26, 1960 |